May 23, 1961  C. E. PARKER  2,985,322
APPARATUS FOR HANDLING RIGID SHEET MATERIAL
Filed Feb. 7, 1958  5 Sheets-Sheet 1

May 23, 1961 C. E. PARKER 2,985,322
APPARATUS FOR HANDLING RIGID SHEET MATERIAL
Filed Feb. 7, 1958 5 Sheets-Sheet 4

United States Patent Office 2,985,322
Patented May 23, 1961

2,985,322
APPARATUS FOR HANDLING RIGID
SHEET MATERIAL

Clarence E. Parker, deceased, late of Painesville, Ohio, by Frieda Parker, executrix, Painesville, Ohio, assignor to The Coe Manufacturing Company, Painesville, Ohio, a corporation of Ohio Filed Feb. 7, 1958, Ser. No. 713,872
3 Claims. (Cl. 214—6)

The present invention relates to apparatus for handling rectangular articles and more particularly to the stacking of articles such as wallboards, plaster laths, etc. or bundles thereof.

One of the principal objects of the invention is the provision of novel and improved material handling apparatus which will receive rigid rectangular articles fed thereto by a conveyor and arrange them in piles or stacks with two or more articles in each layer for subsequent handling by means engaging the underside of the stack intermediate its ends or sides, which apparatus will be capable of high speed operation without injury to the material handled, regardless of its fragility, and which will nevertheless be relatively simple in construction, inexpensive to manufacture, and reliable in operation.

Another object of the invention is the provision of novel and improved material handling apparatus of the character referred to for stacking articles, the lengths of which are multiples of their widths in layers of two or more articles with the number of articles in each layer being equal to the length of the articles divided by their widths and with the articles of two or more layers positioned transversely of each other.

The invention resides in certain constructions and combinations and arrangements of parts and further objects and advantages thereof will be apparent to those skilled in the art to which it relates from the following description of the preferred embodiment described with reference to the accompanying drawings, forming a part of this specification, in which similar reference characters designate corresponding parts, and in which:

Although it is to be understood that the invention may be otherwise embodied, it is herein shown and described as embodied in an apparatus for stacking uniform size bundles of plaster laths in layers of three bundles each. The length of each bundle is three times its width, and if desired, the bundles of two or more layers may be arranged transversely of each other to key or tie the stack together.

Figures 1, 6:
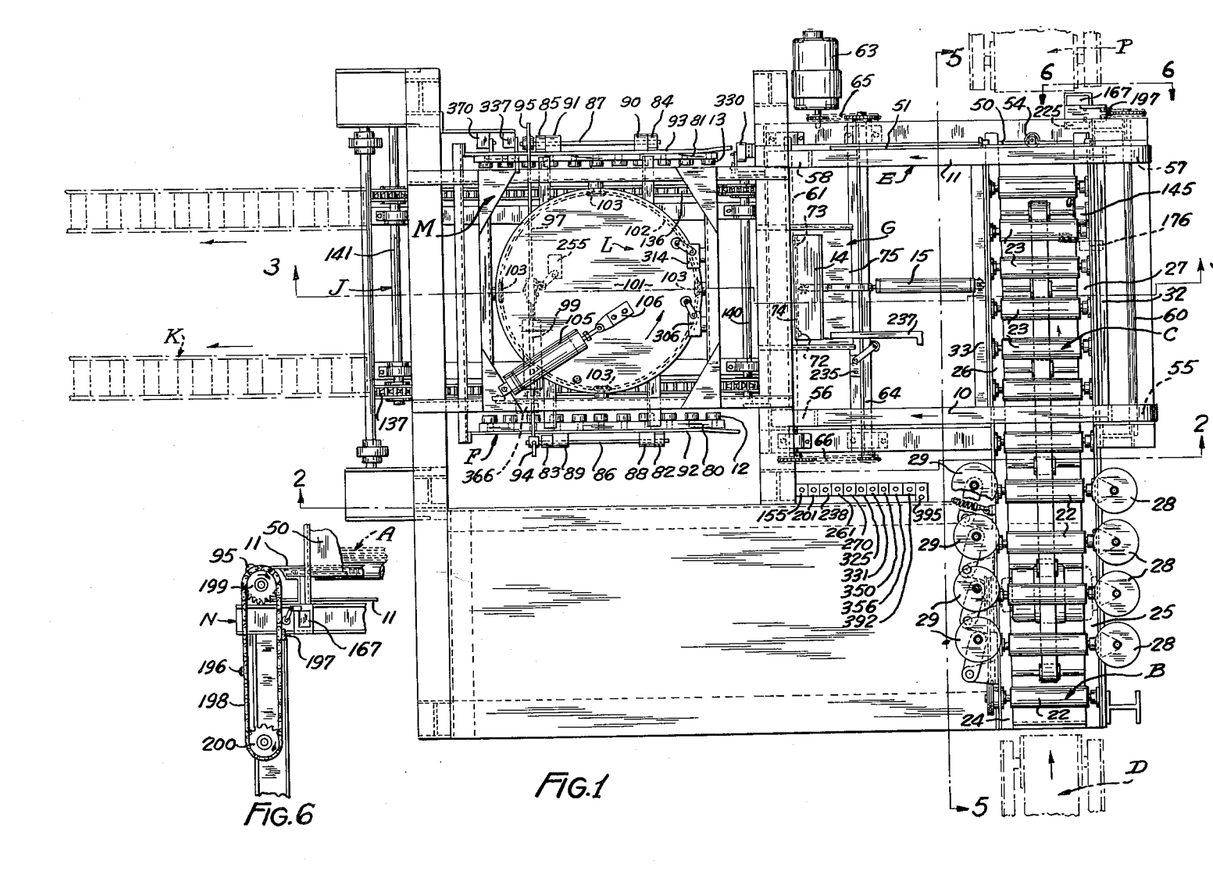
Fig. 1 is a plan view of a material handling apparatus embodying the present invention.
Fig. 6 is a fragmentary rear elevational view.

Generally speaking, the apparatus shown comprises two aligned driven roll-type conveyor sections B and C located adjacent to the right-hand end of the apparatus as viewed in Fig. 1 which conveyor sections are adapted to receive articles to be stacked, such as bundles of plaster laths designated A delivered to the apparatus in tandem relationship from a feed conveyor D. The length of the conveyor section C is approximately equal to that of a bundle of laths and as the leading end of each bundle reaches the far end of the conveyor section, the section drops a short distance to transfer the bundle onto a cross conveyor E in the form of two belts 10, 11 which are intermittently driven in timed relation to the lowering of the conveyor section C. The cross conveyor E moves the bundle just transferred thereto toward the left a sufficient distance to clear the conveyor section C; that is, to a position at the left of the conveyor section C, as viewed in Fig. 1, and where it will not interfere with the succeeding bundle fed to the conveyor section C.

As bundles of laths arrive on the conveyor section C, they are transferred to the cross conveyor E which is intermittently operated until it has received three bundles positioned thereon in side by side relationship. The conveyor E is then driven to transfer the bundles to a horizontal conveyor means F comprising two horizontally spaced rows of caster-like wheels 12, 13 adapted to engage underneath opposite ends of the bundles as they are fed thereto. The caster-like wheels are not driven and the bundles are pushed thereon by the belts of conveyor E in so far as they are capable of performing this operation. The bundles are thereafter moved to their final position on the conveyor means F by a mechanism G comprising what may be referred to as a disappearing pusher 14 actuated by a fluid pressure motor 15 in timed relation to the other operations of the apparatus.

The caster-like wheels of the conveyor means F are subsequently withdrawn from underneath the ends of the bundles thereon and the bundles permitted to drop onto a vertical or stacking conveyor or elevator H which, in turn, is periodically lowered in steps as bundles are positioned thereon. The stack thus formed in the vertical conveyor H may be removed in any convenient manner as by a power actuated generally horizontal discharge conveyor J and a gravity conveyor K of any suitable construction.

The conveyor means F comprising the caster-like wheels, previously referred to, is supported or carried by a turret L rotatably supported in the superstructure M of the frame N of the apparatus and in the event the length of each bundle is a multiple of its width, the turret can be rotated 90° just before the caster-like wheels of the conveyor means F are withdrawn from underneath the bundles on the conveyor means F to position the bundles of alternate or different layers in the stack being formed upon the vertical conveyor H in opposite directions. The frame N is constructed of suitable structural shapes welded or otherwise connected together, but the particular construction shown forms no part of the present invention and only those parts which are necessary to an understanding of the invention will be hereinafter referred to.

The conveyor sections B and C each comprise a series of five horizontal rolls 22, 23 respectively, supported in suitable bearing brackets projecting upwardly from vertical webs of pairs of angle irons 24, 25 and 26, 27, respectively. The angle irons 24, 25 are fixedly secured to the upper part of the frame N and in addition to the horizontal rolls 22, support two series of edge or side rolls adjacent to opposite ends of the rolls 22. Each series of edge rolls comprises four rolls 28, 29, respectively. The rolls 28 are located adjacent to the right-hand ends of the rolls 22 and are rotatably supported about fixed vertical axes; whereas, the rolls 29 which are at or adjacent to the other ends of the rolls 22, are yieldably supported for movement toward and from the adjoining ends of the rolls 22. The construction is such that the rolls 29 align any bundles passing through the conveyor section B with the rolls 28 and in turn the length of the conveyor section, if they are not perfectly aligned therewith.

Opposite ends of the angle irons 26, 27 which carry the rolls 23 of the conveyor section C are connected to and supported by the upper ends of pairs of bell crank levers 30, 31, one pair being located adjacent and connected to opposite ends of the angle irons 26, 27. The bell crank levers are pivotally connected to cross members 32, 33 of the frame and are normally held in position to maintain the rolls 23 above the level of the belts 10, 11 of the cross conveyor E by a double acting fluid pressure operated motor 35 pivotally supported to a cross member of the frame, the piston of which motor is connected by a rod 36 to the upper end of a lever 37 connected to a shaft 38 pivotally supported in the frame and extending lengthwise of the conveyor section C. Opposite ends of the shaft are provided with levers 40, 41 which levers are in turn connected by links 42, 43 to the respective bell crank levers 30, 31. When the fluid pressure motor 35 is reversed, the angle irons 26, 27 and in turn the rolls 23 are moved or dropped to a position below the upper reaches of the belts 10, 11 of the cross conveyor E with the result that a bundle on the conveyor section C is transferred to the cross conveyor E.

The rolls 22, 23 of the conveyor sections B and C are driven at uniform speed by a continuous belt 45 looped about suitable pulleys carried by the angle irons 24, 25 and 26, 27, some of which pulleys are interspersed between the rolls 22, 23 in such a manner that the outside of the belt 45 engages the underside of all of the rolls 22, 23. The belt is driven from an electric motor 46 through a speed reducer 47 and a flexible drive designated generally as 48. The rolls of the conveyor sections B and C are driven at approximately three times the speed of the feed conveyor section D with the result that bundles fed to the conveyor section C are separated a minimum distance irrespective of whether or not they are spaced with respect to one another on the conveyor D. This permits a leading bundle to be transferred by the cross conveyor E and to be moved thereby to one side of the conveyor section C before the next succeeding bundle is fed to the conveyor section C.

The rolls 23 in the embodiment shown are continuously driven and bundles of laths fed thereto are prevented from overrunning the conveyor section C by a bumper bar 50 extending along the discharge end of the conveyor section C and in line with a similar bar 51 along the far side of the cross conveyor E. The bumper bar 50 is slidably supported in the frame for vertical movement to and from a position in front of a bundle of laths moving forwardly on the conveyor section C. The bumper bar 50 is connected to the piston rod of a double acting fluid pressure motor 54 adapted to normally maintain the bumper bar in the position shown; that is, in position to be engaged by the leading end of a bundle of laths on the conveyor section C but operable to lower the bar to a position beneath the line of travel of the bundles. If for some reason the operator of the apparatus does not desire a particular bundle to be transferred from the conveyor section C to the cross conveyor E and in turn the stack being formed in the vertical conveyor H, he presses a push button switch, hereinafter referred to, to actuate the motor 54 to lower the bumper bar 50 into its down position. In this event the bundle of laths on the conveyor section C continues on in a straight line to an auxiliary conveyor P.

The belts 10 and 11 of the cross conveyor E are reeved about suitable pairs of pulleys 55, 56 and 57, 58 carried by shafts 60, 61 rotatably supported in the frame at opposite ends of the cross conveyor. The shaft 61 and in turn the belts 10 and 11 are intermittently operated from an electric motor 63 connected to a shaft 64 by a sprocket chain drive 65. The shaft 64 is in turn connected to the shaft 61 by a sprocket chain drive 66.

Figure 2:
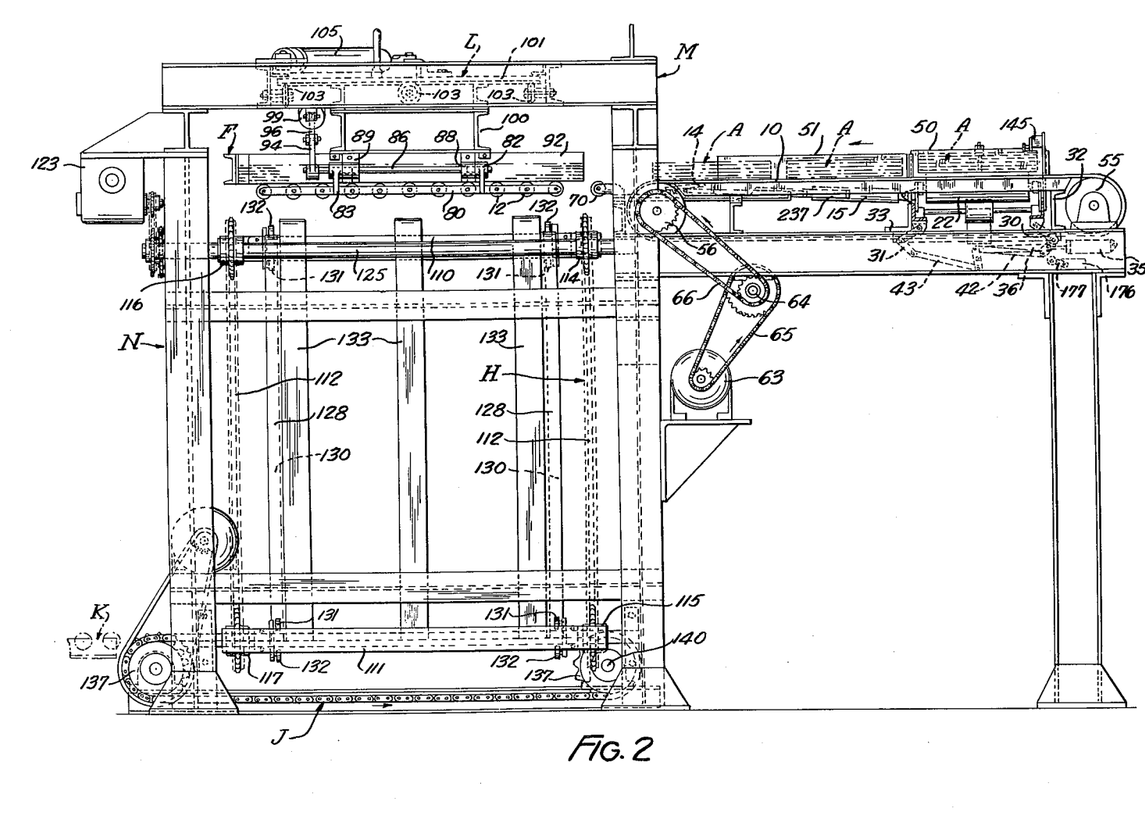
Fig. 2 is a sectional view taken approximately on line 2—2 of Fig. 1.

As the third bundle of laths is dropped onto the cross conveyor E, the motor 63 is operated, in a manner hereinafter more fully described, to transfer the three bundles of laths thereon to the horizontal conveyor means F or more specifically to the series of wheels 12, 13 of the conveyor means F. The gap intermediate the left-hand ends of the belts 10, 11, as viewed in Figs. 1 and 2, and the right-hand wheels of the horizontal conveyor means F is spanned in part by a pair of wheels 70, 71 rotatably supported in the upper ends of brackets suitably connected to the frame.

As previously stated, the wheels 12, 13 are not driven and it will be apparent that actuation of the belts 10, 11 will not fully transfer the last bundle onto the horizontal conveyor means F. The leading bundles will be pushed along the horizontal conveyor means F by the trailing bundles, but it is necessary to provide supplemental means for pushing the last bundle onto the horizontal conveyor means. In the present instance, this is accomplished by the disappearing pusher 14 forming a part of the mechanism G previously referred to. The pusher 14 is in the form of a generally horizontal plate, the left-hand end of which is pivotally connected to brackets 72, 73 by a rod 74. The brackets 72, 73 form part of a slide member 75 supported in the frame for linear movement longitudinally of the travel of the cross conveyor. The double acting fluid pressure actuated motor 15, previously referred to, has its piston rod pivotally connected to the rear or right-hand side of the pusher 14 at a point slightly above the axis of the rod 74 and approximately midway between the upper and lower edges of the pusher. The construction is such that as the fluid pressure motor 15 is actuated to extend its piston rod, the pusher 14 first pivots about the rod 74 in the manner illustrated in Fig. 3 to engage the right-hand or rear side of the trailing bundle on the cross conveyor. When the pusher plate 14 reaches a vertical position its lower end hits the top of the plate or member 75 and continued operation of the motor 15 slides the member 75 with the brackets 72, 73 and the pusher 14 in a forwardly direction a sufficient distance to properly locate the bundles of laths in the horizontal conveyor means F.

Figure 4:
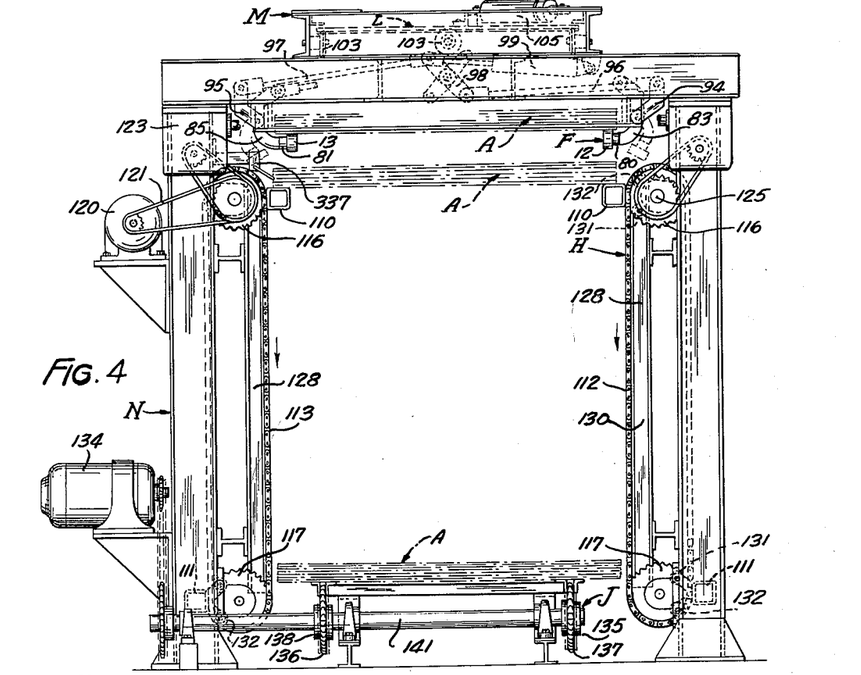
Fig. 4 is a left end elevational view of the apparatus as shown in Fig. 1.
Figure 5:
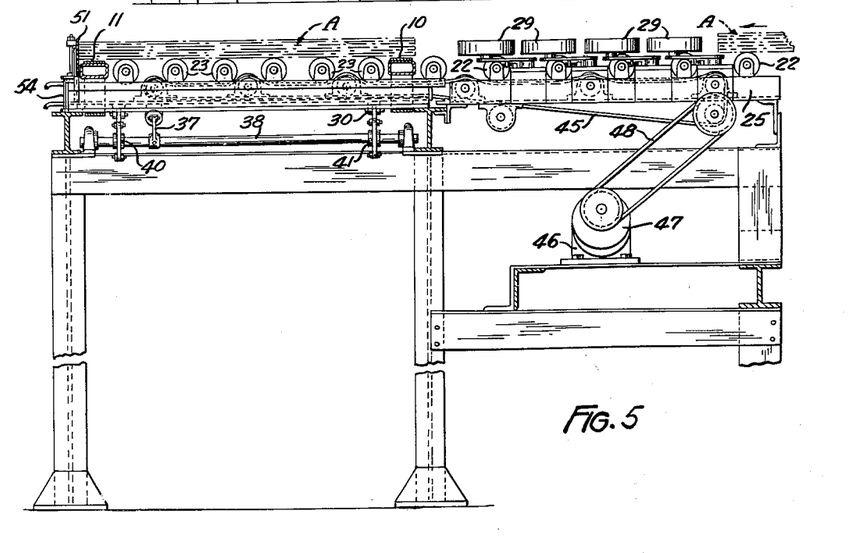
Fig. 5 is a sectional view taken approximately on line 5—5 of Fig. 1.
Figure 7:
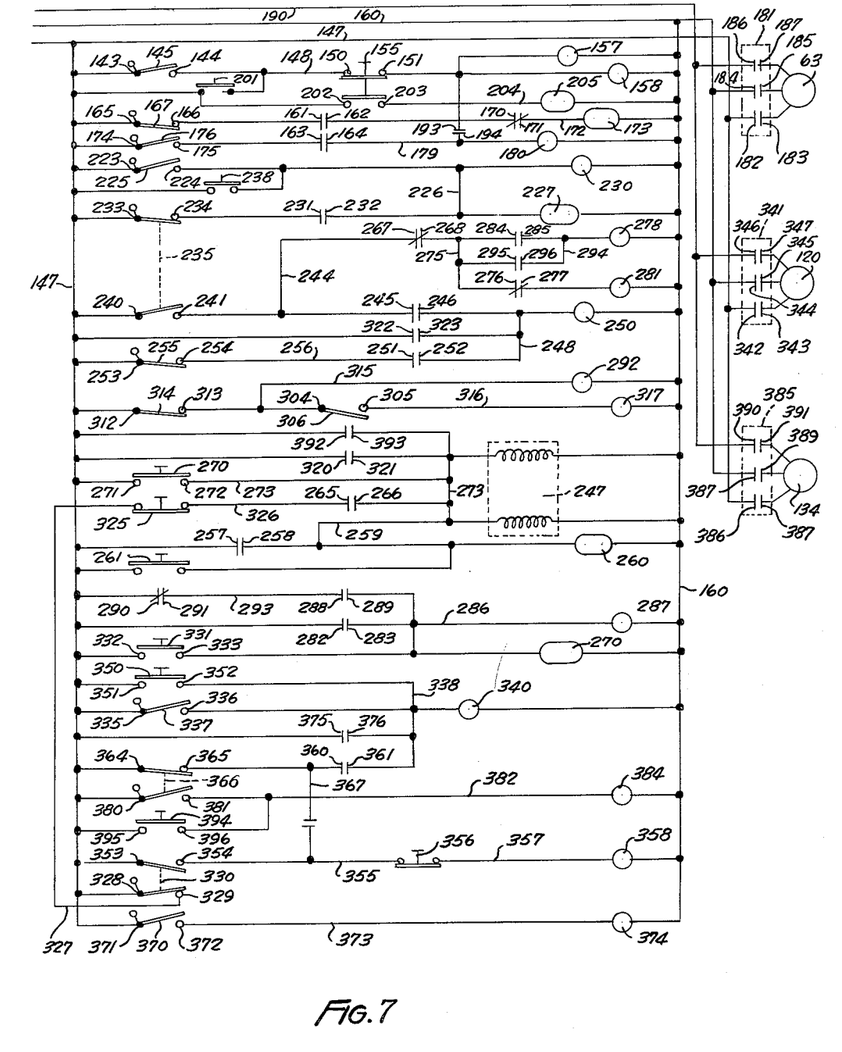
Fig. 7 is a schematic diagram showing the controls incorporated in the apparatus.

The wheels 12, 13 of the horizontal conveyor means F are rotatably connected to rectangular rod-like members 80, 81, respectively, extending lengthwise along opposite sides of the conveyor means F. The members 80, 81 are connected by brackets 82, 83 and 84, 85 to rods 86, 87 pivotally connected by brackets 88, 89 and 90, 91 to respective side plates 92, 93 of the turret L. The rods 86, 87 are operatively connected by levers 94, 95 and links 96, 97 to opposite ends of a lever 98 pivotally connected intermediate its ends to the turret L. The upper end of the lever 98 as viewed in Fig. 4 is connected to the piston rod of a double acting fluid pressure motor 99, also supported in the turret L. Operation of the motor 99 in opposite directions moves the wheels 12 and 13 into and out of a position underneath opposite ends of bundles transferred to the conveyor means F; that is, between the full line and dot-dash line positions shown in Fig. 4. When in the dot-dash line positions, the wheels 12, 13 are clear of the ends of bundles in the conveyor F.

The frame of the horizontal conveyor means F and more particularly the side plates thereof 92, 93, previously referred to, are welded to the lower end of a built up column 100 forming a part of the turret L. The plates 92, 93 are placed as close together as consistent with other requirements so that the ends of the articles transferred to the conveyor means F will be aligned with one another. At the entrance end of the conveyor the members 92, 93 are flared outwardly to facilitate entrance of the articles being transferred to the conveyor. The upper end of the column 100 is welded to the underside of a disc-like plate 101 having an annular groove 102 in the underside spaced slightly inwardly of its periphery and within which groove a plurality of rollers 103 engage and by virtue of which the plate is supported for rotation about a vertical axis. The rollers 103 are rotatably supported on suitable axles fixed in the superstructure M of the frame and are equally spaced about the axis of rotation of the turret L. The turret L is adapted to be oscillated 90° from the position shown in the drawings; that is, to a position in which the series of wheels 12, 13 are crosswise of the direction of travel of the cross conveyor E, by a double acting fluid pressure motor 105 located above the plate 101 and having one end pivotally connected to the superstructure M of the frame, and the projecting end of its piston rod to a bracket 106 bolted to the plate 101 at a point spaced from its axis of rotation. The construction is such that after a layer of bundles has been transferred from the cross conveyor E to the horizontal conveyor means F, the turret can be rotated by actuation of the fluid pressure motor 105 through 90° and the wheels 12, 13 subsequently withdrawn from underneath the ends of the bundles to drop or dump the bundles onto the stack being formed in the vertical conveyor H with their lengths running lengthwise with respect to the direction of travel of the cross conveyor E. If the turret is not rotated and the wheels 12, 13 are withdrawn from underneath the ends of the bundles forming the layer in the horizontal conveyor, the bundles will be dropped onto the vertical conveyor or elevator H or the stack of bundles therein with their lengths running crosswise of the direction of travel of the cross conveyor. In other words, alternate layers may be made to run in different directions or any desired arrangement may be employed.

When the first layer of bundles of laths in any particular stack being formed in the vertical or stacking conveyor H is dumped by the horizontal conveyor means F upon withdrawal of the wheels 12, 13 from underneath opposite ends of the respective bundles in the layer, the bundles drop upon one pair 110, 110 of two pairs of tubular elevator or load bars 110, 110 and 111, 111 of rectangular cross section located underneath the wheels 12, 13. One bar of each pair is located at opposite sides of the vertical conveyor H. The load bars are connected to and carried by pairs of sprocket chains 112, 112 and 113, 113 located at opposite sides of the conveyor H. The pairs of sprocket chains are reeved about suitable pairs of sprocket wheels 114, 115 and 116, 117 at opposite sides of the conveyor. The sprocket chains are adapted to be intermittently operated to drop the members 110, 111 in steps as the layers of bundles are placed thereon or on the stack thereabove by an electric hoist motor 120 connected by a drive 121 to the shaft 122 which carries the upper sprocket wheels for the left-hand pair of spocket chains 112, as viewed in Fig. 4. A cross drive designated generally by the reference character 123 connects the upper shaft 122 at the left-hand side of the conveyor, as viewed in Fig. 4, with the upper shaft 125 at the right-hand side of the conveyor. The shaft 125 carries the upper pair of sprocket wheels 114, 116 for the pair of sprocket chains 112.

The distance that the pair of load bars 110, 110 drop upon each actuation of the motor 120 is approximately equal to the thickness of a layer of bundles. By this arrangement, the top of the stack being formed in the vertical conveyor H is always maintained only a slight distance below the horizontal conveyor means F with the result that the successive layers of bundles fed to the stack merely drop a short distance as they are transferred from the horizontal conveyor means F to the stack being formed in the vertical conveyor H.

In their travel from the upper sprocket wheels to the lower sprocket wheels the load bars facing towards each other are prevented from tilting and spreading, or moving outwardly with respect to the stack of bundles being formed, by structural members 128 forming a part of the frame and having grooves or tracks 130 therein, within which pairs of vertically spaced wheels or rollers 131, 132 connected to the load bars travel. Vertically extending wooden strips 133 located intermediate the respective sprocket chains with the edges of the strips facing one another, being in line with the inner reaches of the chains, assist in guiding the stack in its vertical movement.

When the bottom of the stack of bundles being formed in the vertical conveyor H reaches the bottom of the conveyor, the stack is transferred by the discharge conveyor J driven by an electric motor 134 which conveyor transfers the stack to the gravity conveyor K and in turn a desired location. Other means, for example, a fork type lift truck, may be employed to remove the stack of bundles from the vertical conveyor H.

In the embodiment of the invention shown, the motor 120 is always operated in the same direction and each pair of sprocket chains 112, 113 carries one of the load bars of each pair connected thereto so that when one pair of bars reaches the bottom of the vertical conveyor and transfers the stack formed thereon to the conveyor J, the second pair of bars is in position to receive the first layer of bundles of the succeeding stack.

The conveyor J comprises a pair of sprocket chains 135, 136 each of which is reeved about a pair of sprocket wheels 137, 138 connected to transversely extending shafts 140, 141 the latter of which is connected by a sprocket chain drive 142 to the electric motor 134. The upper reaches of the sprocket chains 135, 136 are supported to prevent sagging by the load thereon by channel members connected to the frame of the apparatus.

As the leading end of a bundle of laths on the conveyor section C approaches the bumper bar 50, it closes normally open contacts 143, 144 of a switch 145 fixed to the frame and having a control member projecting into the path of travel of the bundles. The closing of the switch 145 establishes a circuit from a control power line 147 through the now closed contacts 143, 144 of switch 145, a wire 148, normally closed contacts 150, 151, of a manually operable reject switch 155, wire 156, time delay relay 157, and a control relay 158 in parallel circuit with the time delay relay 157 to the other control power line 160. Energization of the control relay 158 closes its normally opened contacts 161, 162 and 163, 164. The closing of the contacts 161, 162 establishes a circuit from the line 147 through normally closed contacts 165, 166 of a switch 167, wire 168, now closed contacts 161, 162, wire 156, normally closed contacts 170, 171 of time delay relay 157 which contacts are now closed since the relay is of the delayed opening type, wire 172 and solenoid valve 173 which controls the direction of flow of pressure fluid to and from the motor 35, to line 160. Operation of the motor 35 drops the rolls 23 of the conveyor section C to their down position thus transferring the bundle of laths thereon to the belts 10, 11 of the cross conveyor E.

As the conveyor section C drops, it closes normally open contacts 174, 175 of switch 176 fixed to the frame and having an operating member 177 projecting in the path of one of the rocker arms or bell crank levers 30. The closing of contacts 174, 175 of switch 176 establishes a circuit from the control line 147 through the now closed contacts 174, 175 of switch 176, wire 178, now closed contacts 163, 164 of control relay 158, wire 179, operating solenoid 180 of motor controller 181 for the cross conveyor motor 63. Energization of the solenoid 180 closes the normally open contacts 182, 183 and 184, 185 and 186, 187 of motor controller 181 connecting the motor 63 to the power lines 147, 160, 190 causing the motor to operate in a direction to move the bundle or bundles of laths thereon toward the left as viewed in Figs. 1 and 2. Simultaneously with the energization of the motor 63, a normally open pair of holding contacts 193, 194 on the motor controller 181 is closed establishing a holding circuit for the solenoid 180 from the line 147 through switch 167, wire 168, relay contacts 161, 162, wire 156, contacts 193, 194, and wire 179 which maintains the motor 63 operating and the solenoid 173 which controls the motor 35 energized subsequent to the movement of the bundle of laths away from the actuation of the switches 145 and 176 respectively.

The switch 167 is located adjacent to the rear right-hand end of the cross conveyor E as the apparatus is viewed in Fig. 1 and after a predetermined travel of the conveyor belts 10, 11, the switch is opened by the first of three trips 195, 196, 197 upon a sprocket type timing chain 198 connected to a sprocket wheel 199 fixed to the rear end of the shaft 60 and to an idler sprocket 200 fixed to the frame of the apparatus. The trip 195 is adjustably connected to the timing chain 198 and is set to open the switch 167 after the belts 10, 11 have moved sufficiently to carry a bundle of laths transferred thereto from the conveyor section C to the left-hand side of the conveyor section and into a position where it will not interfere with a succeeding bundle of laths moving onto the conveyor section C. After a predetermined time interval, the contacts 170, 171 of the time delay relay 157 open thus breaking the circuit to the solenoid valve 173 which controls the motor 35 thereby causing the motor to reverse and the conveyor section C to return to its up position, if this has not already occurred by the prior opening of the switch 167 as will be the case except upon each third operation of the motor 35.

The cycle of operation just referred to can be initiated at the will of an operator by the mere depressing of a push-button switch 201 located at a control station at the near side of the apparatus as viewed in Fig. 1. The switch 201 is in parallel circuit with the switch 145 between the control power line 147 and the wire 148. The operator may also prevent automatic operation of the cycle referred to and cause the bumper bar 50 to be moved below the line of travel of a bundle of laths on the conveyor section C by depressing the reject push-button switch 155 previously referred to, which switch is also located at the control station. In addition to the normally closed set of contacts, 150, 151 previously referred to, the reset button 155 contains a pair of normally open contacts 202, 203 which when closed by the depressing of the switch actuator establishes a circuit from the control power line 147 through wire 204 and solenoid valve 205 which controls the flow of fluid pressure to and from the motor 54 connected to the bar 50 to the line 160.

Upon each third actuation of the motor 63, the trip 197 which actuates the switch 167 is so positioned on the timing chain 198 that the motor continues to operate until the bundles of laths on the belts, 10, 11 have been moved into the horizontal conveyor means F as far as the belts are capable of moving them. In this event the circuit to the solenoid valve 173 which controls the motor 35 had previously been opened by the time delay relay 157 so as to permit the conveyor section C to raise for the reception of an oncoming bundle of laths.

Simultaneously with the opening of the switch 167 which discontinues operation of the motor 63, normally open contacts 223, 224 of switch 225 are closed preferably by the same trip 197 which actuated the switch 167. The closing of the contacts 223, 224 of switch 225 establishes a circuit from the control power line 147 through wire 226 and solenoid valve 227 which reverses the direction of operation of the double acting fluid pressure motor 15 causing the motor to actuate the pusher to push the bundles of laths into their final position in the conveyor means F. Simultaneously with the energization of solenoid valve 227 for controlling the motor 15, a relay 230 is energized, the operating solenoid of which is in parallel circuit with the solenoid valve 227. Operation of the relay 230 closes its normally open contacts 231, 232 establishing a holding circuit through normally closed contacts 233, 234 of a switch 235 with which contacts they are connected by a wire 236. This holding circuit maintains the solenoid valve 227 energized subsequent to the opening of switch 225 until the pusher reaches the end of its stroke at which time a trip 237 connected to the pusher opens the normally closed contacts 233, 234 of switch 235, reversing the direction of operation of the motor 15. The pusher 14 may be operated by the operator at any desired time by a push-button switch 238 in parallel circuit with the switch 225 between the line 147 and the wire 226.

Simultaneously with the opening of the contacts 233, 234 of switch 235 which switch is actuated by the pusher, normally open contacts 240, 241 thereof are closed. The closing of these contacts establishes a circuit from line 147 through contacts 240, 241, wire 244, normally open but now closed contacts 245, 246, of a reset counter 247, wire 248, and time delay relay 250 to line 160. The closing of contacts 240, 241 of switch 235 at the end of the pusher stroke is merely instantaneous and a holding circuit for relay 250 is established by the closing of the instantaneous close contacts 251, 252 of time delay relay 250 which establish a circuit from the line 147 through normally closed contacts 253, 254 of switch 255, wire 256, and contacts 251, 252 to wire 248 and in turn the time delay relay. After a predetermined time delay, the delayed closing contacts 257, 258 of time delay relay 250 close, establishing a circuit from the line 147 through wire 259 and solenoid valve 260 which controls the operation of the motor 99 causing the wheels 12, 13 of the conveyor mechanism F to be withdrawn from underneath the ends of bundles of laths thereon and the load thus supported, dumped or dropped either upon one of the pairs of elevator bars 110, 111, or upon the top of the stack of bundles in the vertical conveyor or elevator H. As the fluid pressure motor 99 reaches the end of its stroke, a trip thereon opens the switch 255 causing the motor to reverse and return the wheels 12, 13 of the conveyor mechanism F to their up position; that is, to the position in which they receive bundles of laths from the cross conveyor E.

The dump motor 99 can be actuated at any time by the operator by the depressing of a push button switch 261 at the control station, which switch is in parallel circuit with the contacts 257, 258 of time delay relay 250 between the line 147 and the wire 259.

In the embodiment of the invention shown, the so-called counter or counting relay 247, previously mentioned, contains in addition to the contacts 245, 246 which are normally open, but are closed during the count, normally open reset contacts 265, 266 and normally closed contacts 267, 268. The counter is started at the beginning of the operation of the apparatus by the operator depressing the counter start push button switch 270 to close its normally open contacts 271, 272 the first of which is connected to the line 147 and the second to the counter by wire 273. This closes contacts 245, 246 and 265, 266 during the count and opens the normally closed contacts 267, 268 which are provided for the purpose of giving non-repeat impulses.

The counter 247 is inserted in the control in such a way that after each predetermined number of operations of the switch 235, the counter is counted out and the circuit for the solenoid valve 260 is not established upon the next closing of the normally open contacts 240, 241 of the switch 235, but in its place a circuit for a solenoid valve 274 which controls the actuation of the turret turn motor 105 is established. As shown, an Eagle Microflex Reset Counter is employed. This counter is commercially available and is manufactured by Eagle Signal Corporation, Moline, Illinois. It is, however, to be understood that any suitable counter or counting relay may be employed.

The counter 247 is initially started, as previously stated, by the operator depressing the push button switch 270 to close its normally open contacts 271, 272. After a predetermined number of counts; that is, operations of the switch 235 and in turn the time delay relay 250, the then closed counter contacts 245, 246 and 265, 266 open and the non-repeat contacts 267, 268 close. Upon the next operation of the switch 235 and the closing of its normally open contacts 240, 241, a circuit is established from the power line 147 through contacts 240, 241 of switch 235, wire 244, now closed contacts 267, 268 of the counter 247, wire 275 normally closed contacts 276, 277 of relay 278, wire 280, and relay 281 to line 160. Energization of the relay 281 closes its normally open contacts 282, 283 and 284, 285. The closing of contacts 282, 283 of relay 281 establishes a circuit from the control power line 147 through the now closed contacts 282, 283 of relay 281, wire 286, and solenoid valve 274 to line 160. Energization of the solenoid valve 274 actuates the turn motor 105 causing the motor to rotate the turret L 90° positioning the bundles of laths on the horizontal conveyor means F transversely of the direction in which they were moved into the conveyor means. Simultaneously with the energization of the solenoid valve 274, relay 287 in parallel circuit therewith is energized to close its normally open contacts 288, 289, establishing a holding circuit for the solenoid valve 274 from the line 147 through normally open but now closed delayed opening contacts 290, 291 of time delay relay 292, wire 293, contacts 288, 289, wire 286, and relay 287 to line 160. This holding circuit is necessary to maintain the turret L in its rotated position until the load on the horizontal conveyor H has been dumped or dropped onto the stack of bundles of laths therebelow in the vertical elevator or conveyor H because simultaneously with the closing of the normally open contacts 282, 283 of relay 281, the normally open contacts 284, 285 thereof, close establishing a circuit for relay 278 from the wire 275 through the contacts 284, 285, wire 294 and relay 278 to line 160. Energization of relay 278 opens the normally closed contacts 276, 277 previously referred to and which contacts are in series circuit with relay 281. Energization of relay 278 also closes the normally open contacts 295, 296 in parallel circuit with contacts 284, 285 of relay 281 thus establishing a holding circuit for relay 278.

As the turret L moves toward its rotated position, an actuator 297 thereon closes normally open contacts 304, 305 of switch 306 for an instant, establishing a circuit from the line 147 through normally closed contacts 312, 313 of switch 314, wire 315, now closed contacts 304, 305 of switch 306, wire 316, and relay 317 to line 160. Energization of relay 317 closes its normally open contacts 320, 321 and 322, 323. The closing of contacts 320, 321 which are in parallel circuit with the counter start push button switch 270 between the line 147 and the wire 273, starts the counter. The simultaneous closing of the contacts 322, 323 of relay 317 establishes a circuit from the line 147 through the wire 248 for the time delay relay 250 to line 160. Energization of the time delay relay 250 closes its instant closed contacts 251, 252 to establish a holding circuit therefor from the line 147 through normally closed contacts 253, 254 of switch 255 and wires 256, 248 to line 160. Upon the closing of the delay closed contacts 257, 258 of time delay relay 250, solenoid valve 260 is energized in a manner previously described to actuate fluid pressure motor 99 causing the same to drop the load on the horizontal conveyor F onto the stack in the vertical conveyor H. At the end of the dumping operation, the horizontal conveyor is returned to its original position in a manner previously described.

In the interim between the time the switch 306 is actuated and the time the dump solenoid 260 is energized, which interim is controlled by the time delay relay 250, the turret reaches the end of its movement and the actuator 297 opens the normally closed contacts 312, 313 of switch 314 breaking a circuit from the line 147 through the contacts 312, 313, wire 315, and time delay relay 292 to line 160. The breaking of this circuit allows contacts 290, 291 of time delay relay 292 to open after a predetermined interval de-energizing relay 287 and solenoid valve 274 causing the turn motor to be actuated in the opposite direction to return the turret to its initial position. During the interval that the delay open contacts 290, 291 of time delay relay 292 remained closed, the load on the horizontal conveyor F was dumped or dropped onto the stack of bundles of laths in the elevator H.

Simultaneously with the energization of the solenoid valve 260 which caused the fluid pressure motor 99 to drop the load from the horizontal conveyor F to the vertical conveyor H, the stepping relay also was actuated to step the relay and to again close the contacts 245, 246 thereof in preparation for the oncoming bundles of laths and open the then closed contacts 267, 268 breaking the holding circuit for relay 278 allowing its contacts 295, 296 to open and its contacts 276, 277 to close. When the counter 247 reached the predetermined count and the contacts 245, 246 and 265, 266 opened and the contacts 267, 268 closed, the opening of contacts 265, 266 caused by the counter to rest. The contacts 265, 266 are in series circuit with a manual push button switch 325 by which the counter may be reset at any desired interval. The reset push button switch 325 is also in series circuit through the wires 326, 327 with a normally closed set of contacts 328, 329 of a switch 330 hereinafter again referred to.

The solenoid valve 274 can be manually operated as desired to rotate the turret L 90° by the operator depressing a push button switch 331 located at the control station, to close its normally open contacts 332, 333, establishing a circuit from line 147 through contacts 332, 333 of switch 331, wire 286, and solenoid valve 274 to line 160.

As the load or bundles of laths on the horizontal conveyor F are dropped onto the load bars of the vertical conveyor H, or the top of the stack in the vertical conveyors as the case may be, they close the normally open contacts 335, 336 of switch 337, establishing a circuit from the line 147 through the switch 337, wire 338 and operating solenoid 340 of motor controller 341 to line 160. Energization of the operating solenoid 340 of the motor controller 341 closes the normally open contacts 342 and 343, 344 and 345, 346 and 347 of motor controller 341 which connects the elevator motor 120 to the power lines 147, 160, 190 in such a manner that the motor operates in a direction to lower the bundles of laths in the vertical conveyor. As the bundles of laths move away from the actuator for the switch 337, the switch opens stopping the elevator motor 120. The elevator motor may be moved at any time by the operator by depressing a push button switch 350 located at the operator's position, to close contacts 351, 352 which are in series circuit with the switch 337.

The operation of dropping successive layers of bundles of laths upon the elevator or vertical conveyor H just referred to, continues until the stack in the elevator H has reached a predetermined height at which time the switch 330 is actuated to open its closed contacts 328, 329 of switch 330 and close its contacts 353, 354. The opening of contacts 328, 329 opens the reset circuit for the counter 247 causing the counter to reset in preparation for the following stack to be formed in the vertical conveyor or elevator H.

The closing of contacts 353, 354 establishes a circuit from the line 147 through the contacts 353, 354 which are now closed, wire 355, and elevator motor stop switch 356 which is normally closed, wire 357, and relay 358 to line 160. Operation of relay 358 closes the normally open contacts 360, 361 and 362, 363. The closing of contacts 360, 361 of relay 358 establishes a circuit for the operating solenoid 340 of the motor controller 341 for the elevator motor 120 from the line 147 through the now closed contacts 364, 365 of switch 366, wire 367, contacts 360, 361 of relay 358, wire 338 and operating solenoid 340 to line 160. This either starts the elevator motor or continues its operation in a direction to lower the stack of bundles of laths in the vertical conveyor. The closing of contacts 362, 363 of relay 358 establishes a holding circuit for the relay which will continue operation of the elevator motor 120 in the direction indicated even though switch 330 operates by the stack of bundles of laths in the elevator moving away therefrom to open its then closed contacts 353, 354 and close its contacts 328, 329. The stop push button switch 356 which can be used to stop the operation of the elevator motor at any time is located at the operator's station.

Figure 3:
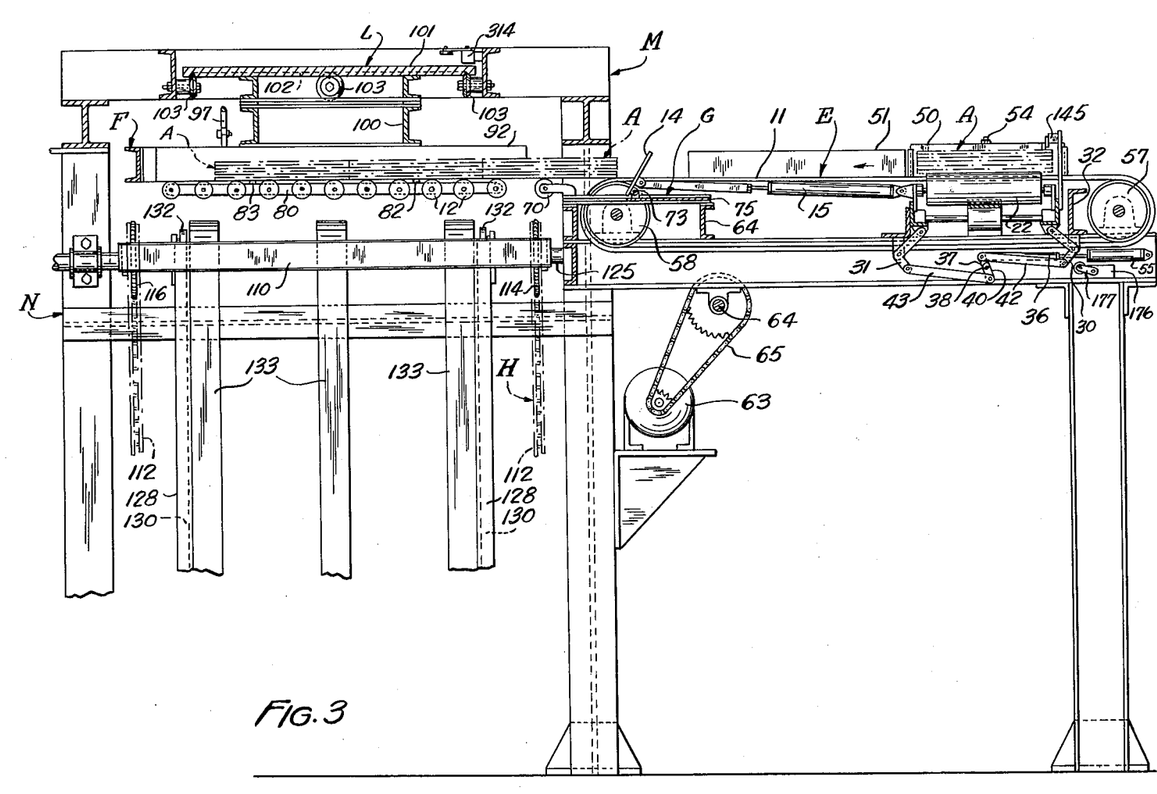
Fig. 3 is a fragmentary sectional view approximately on the line 3—3 of Fig. 2, with some of the parts shown in a different operating position.

Operation of the elevator motor 120 continues in the direction indicated in the manner indicated until a switch 370 is closed by the engagement of an actuator thereon by the idle load bar 111 at the right-hand side of the apparatus as viewed in Fig. 3, which load bar has at this time reached a position at or adjacent to the upper sprocket wheel. The actuation of switch 370 establishes a circuit from the line 147 through its now closed contacts 371, 372, wire 373 and time delay relay 374 to line 160. Operation of the time delay relay 374 closes its normally open contacts 375, 376 which establishes a holding circuit from the line 147 through the now closed contacts 375, 376 of time delay relay 374, wire 338 and direction indicated in the manner indicated until a switch operating solenoid 340 of motor controller 341 which continues the operation of the elevator motor 120 for a predetermined period, as the contacts 375, 376 of the time delay relay 374 are of the delay-open type. This time interval is such that when the contacts 375, 376 open and in turn stop the elevator motor 120, the load bar is in position to receive bundles of laths from the horizontal conveyor F.

When the stack of bundles of laths in the elevator or vertical conveyor H reached the bottom of the conveyor and were transferred by continued movement of the load bars to the horizontal conveyor J, they engaged and operated the switch 366 to open its normally closed contacts 364, 365, previously referred to, breaking the holding circuit for the relay 358 and to close its normally open contacts 380, 381. The closing of the normally open contacts 380, 381 of the switch 366 establishes a circuit from the line 147 through the switch 366, wire 382, and operating solenoid 384 of motor controller 385 to line 160, closing the normally oepn contacts 386, 387 and 388, 389 and 390, 391 connecting the motor 134 to the power lines 147, 160, 190 in such a manner that the motor operates to drive the conveyor J in a direction to remove the stack of bundles of laths thereon out of the vertical conveyor or elevator and onto the conveyor K. The motor controller 385 has a fourth normally open pair of contacts 392, 393 which contacts close upon energization of the solenoid 384 to again start the timer 247. The motor 134 can be operated at any time by a push button switch 394 at the operator's position to close its normally open contacts 395, 396, which contacts are in parallel circuit with the contacts 380, 381 of switch 366 between the line 147 and the wire 382.

The control for the motor 46 which drives the rolls 22, 23 is not shown, but it is of conventional construction and is started and stopped by a start and stop push button switch 395 located at the operator's station.

From the foregoing description of the preferred embodiment of the invention, it will be apparent that the objects heretofore enumerated have been accomplished and that there has been provided an improved apparatus for handling rigid articles, and more particularly, for stacking bundles of plaster boards.

While the preferred embodiment of the preferred invention has been described in considerable detail, it will be apparent that the invention is not limited to the particular construction shown, and it is hereby intended to cover all adaptations, modifications, and uses thereof which come within the practice of those skilled in the art to which the invention relates and the scope of the appended claims.

Having thus described my invention, what I claim is:

1. In apparatus for handling and stacking rigid rectangular articles the lengths of which are multiples of their widths, such as plaster lath and the like, a first conveyor comprising a plurality of members for supporting a plurality of such articles in side-by-side relationship, means for feeding such articles to said first conveyor, first power means for moving a plurality of said members of said first conveyor in a direction to move such articles transversely of their lengths, means for intermittently operating said first power means in timed relation to the movement of such articles onto said first conveyor, a second conveyor adjacent to the discharge end of said first conveyor, said second conveyor comprising movable members adapted to engage underneath and support opposite ends of a predetermined number of such articles transferred thereto in side-by-side relation from said first conveyor, means including a member movable lengthwise of the direction in which such articles are moved on said first conveyor and engageable with the trailing side of the trailing one of said plurality of such articles for positioning such articles on said second conveyor, second power means for reciprocating said member, means for intermittently operating said second power means in timed relation to the operation of said first power means, third power means for moving said movable members of said second conveyor out of said position in which they engage underneath opposite ends of such articles delivered thereto from said first conveyor, means for intermittently operating said third power means in timed relation to the movement of said plurality of such articles onto said second conveyor, a vertical conveyor underneath said second conveyor, said vertical conveyor comprising members engageable underneath opposite ends of a plurality of such articles transferred thereto from said second conveyor, fourth power means for actuating said vertical conveyor in a direction to lower said article engaging members thereof, means for intermittently actuating said fourth power means in timed relation to the delivery of articles from said second conveyor to said vertical conveyor, means for supporting said second conveyor for oscillation through 90° about a vertical axis from a first position to a second position, fifth power means for oscillating said second conveyor between said first and second positions, means for operating said fifth power means to rotate said second conveyor 90° in one direction from said first position to said second position in timed relation to the delivery of such articles to said second conveyor and the transfer of a predetermined number of such articles from said second conveyor to said vertical conveyor, and means for operating said fifth power means to rotate said second conveyor in the direction opposite to said one direction and from said second position to said first position in timed relation to the operation of said third power means while said second conveyor is in said second position.

2. In apparatus for handling and stacking rigid rectangular articles such as plaster lath and the like, a first conveyor comprising a plurality of members for supporting such articles, a first power means for moving a plurality of said members of said first conveyor to move such articles, a second conveyor comprising a plurality of members for supporting such articles in side-by-side relationship, means for supporting said conveyors for movement relative to one another in a direction generally normal to the plane in which said articles are moved by said conveyors to transfer such articles from said first conveyor to said second conveyor, second power means for producing relative movement between said conveyors, means for intermittently operating said second power means in timed relation to the movement of such articles on said first conveyor, third power means for moving a plurality of said members of said second conveyor in a direction to move such articles transversely of their lengths, a third conveyor adjacent to the discharge end of said second conveyor, said third conveyor comprising moveable members adapted to engage underneath and support opposite ends of a predetermined plurality of such articles in side-by-side relation, means for intermittently operating said third power means in timed relation to said movement of said first and second conveyors relative to one another to feed said plurality of such articles to said third conveyor, means including a member movable lengthwise of the direction in which such articles are moved by said second conveyor and engageable with the trailing side of the trailing one of said plurality of such articles for positioning such articles on said third conveyor, fourth power means for reciprocating said member, means for intermittently operating said fourth power means in timed relation to the operation of said third power means, fifth power means for moving said movable member of said third conveyor out of said position in which they engage underneath opposite ends of such articles delivered thereto from said second conveyor, means for intermittently operating said fifth power means in timed relation to the movement of said plurality of such articles onto said third conveyor, a vertical conveyor underneath said third conveyor, said vertical conveyor comprising members engageable underneath opposite ends of a plurality of such articles transferred thereto from said third conveyor, sixth power means for actuating said vertical conveyor in a direction to lower said article engaging members thereof, and means for intermittently actuating said sixth power means in timed relation to the delivery of articles from said third conveyor to said vertical conveyor.

3. In apparatus for handling and stacking rigid rectangular articles the lengths of which are multiples of their widths, such as plaster lath and the like, a first conveyor comprising a plurality of members for supporting such articles, a first power means for moving a plurality of said members of said first conveyor to move such articles in the direction of their lengths, a second conveyor extending in a direction transverse to the direction in which such articles are moved by said first conveyor and comprising a plurality of members for supporting a predetermined plurality of such articles in side-by-side relationship, means for supporting said conveyors for movement relative to one another in a direction generally normal to the plane in which said articles are moved by said conveyors to transfer such articles from said first conveyor to said second conveyor, second power means for producing relative movement between said conveyors, means for intermittently operating said second power means in timed relation to the movement of such articles on said first conveyor, third power means for moving a plurality of said members of said second conveyor in a direction to move such articles transversely of their lengths, a third conveyor adjacent to the discharge end of said second conveyor, said third conveyor comprising movable members adapted to engage underneath and support opposite ends of said predetermined number of such articles in side-by-side relation, means for intermittently operating said third power means in timed relation to said movement of said first and second conveyors relative to one another to accumulate thereon said plurality of such articles in side-by-side relationship and feed them onto said third conveyor, means including a member movable lengthwise of the direction in which such articles are moved by said second conveyor and engageable with the trailing side of the trailing one of said plurality of such articles for positioning such articles on said third conveyor, fourth power means for reciprocating said member, means for intermittently operating said fourth power means in timed relation to the operation of said third power means, fifth power means for moving said movable members of said third conveyor out of said position in which they engage underneath opposite ends of such articles delivered thereto from said second conveyor, means for intermittently operating said fifth power means in timed relation to the movement of said plurality of such articles onto said third conveyor, a vertical conveyor underneath said third conveyor, said vertical conveyor comprising members engageable underneath opposite ends of a plurality of such articles transferred thereto from said third conveyor, sixth power means for actuating said vertically movable conveyor in a direction to lower said article engaging members thereof, means for intermittently actuating said sixth power means in timed relation to the delivery of articles from said third conveyor to said vertical conveyor, means for supporting said third conveyor for oscillation through 90° about a vertical axis from a first position to a second position, seventh power means for oscillating said third conveyor between said first and second positions, means for intermittently operating said seventh power means to rotate said third conveyor 90° in one direction from said first position to said second position in timed relation to the delivery of such articles to said third conveyor and the transfer of a predetermined number of such articles from said third conveyor to said vertical conveyor, and means for operating said seventh power means to rotate said third conveyor in the direction opposite to said one direction and from said second position to said first position in timed relation to the operation of said fourth power means while said third conveyor is in said second position.

References Cited in the file of this patent
UNITED STATES PATENTS

| | | |
|---|---|---|
| 1,490,235 | Smith et al. | Apr. 15, 1924 |
| 1,646,067 | Roberts | Oct. 18, 1927 |
| 2,637,450 | Eshelman | May 5, 1953 |
| 2,710,696 | Fontaine et al. | June 14, 1955 |
| 2,716,497 | Wahl et al. | Aug. 30, 1955 |
| 2,883,074 | Boehl et al. | Apr. 21, 1959 |